Dec. 30, 1941.   F. C. GEIBIG ET AL   2,267,792
METHOD OF AND APPARATUS FOR SEVERING METAL BODIES
Filed June 10, 1939
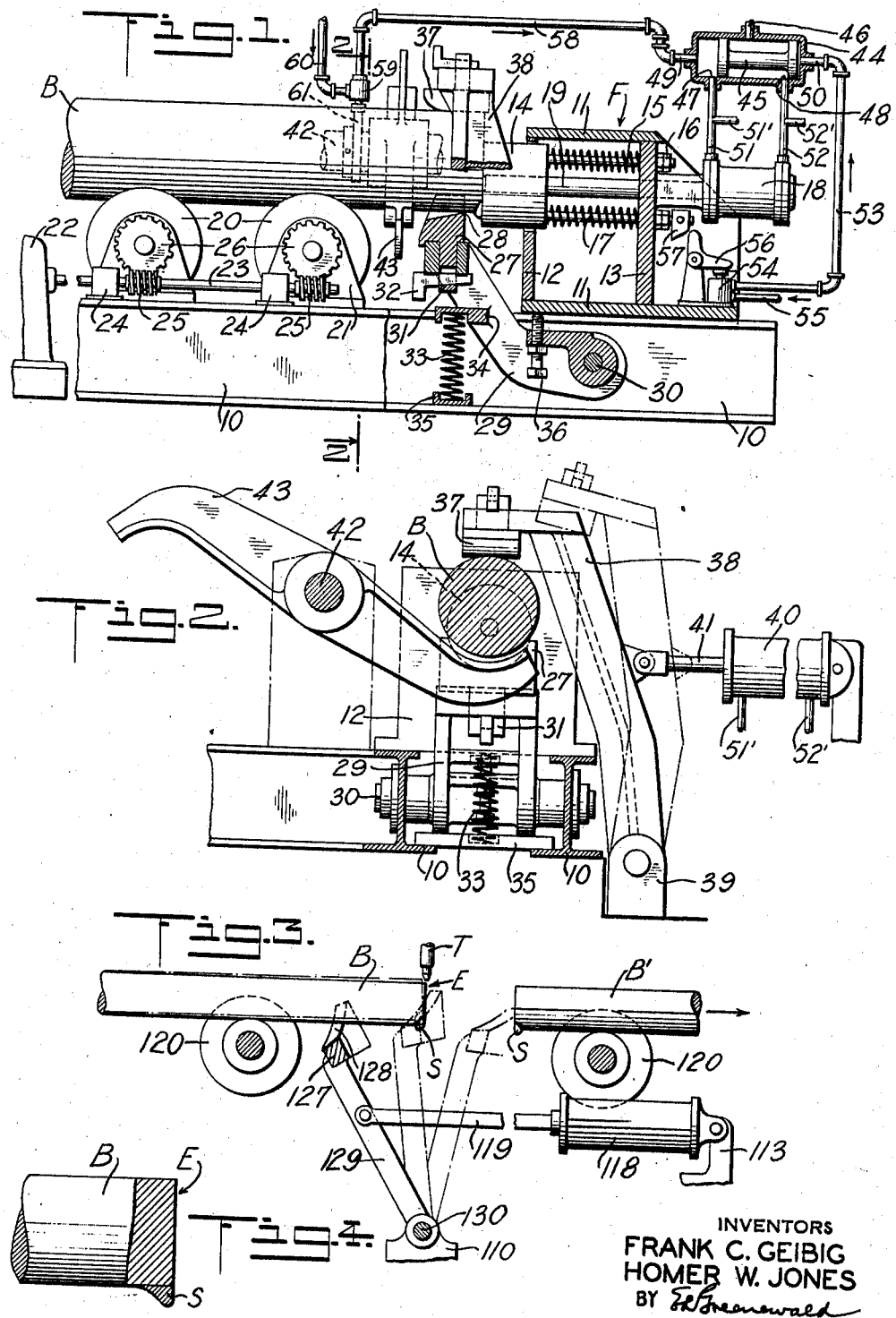
INVENTORS
FRANK C. GEIBIG
HOMER W. JONES
BY
ATTORNEY Patented Dec. 30, 1941

2,267,792

UNITED STATES PATENT OFFICE 2,267,792

METHOD OF AND APPARATUS FOR SEVERING METAL BODIES

Frank C. Geibig and Homer W. Jones, Westfield, N. J., assignors to The Linde Air Products Company, a corporation of Ohio Application June 10, 1939, Serial No. 278,528

19 Claims. (Cl. 148—9)

This invention relates to a method of and apparatus for severing metal bodies and removing a protuberance from such body and more particularly to a method of and apparatus for removing a slag adhesion from the surface of a ferrous metal body adjacent a flame-cut edge thereof.

When ferrous metal bodies are flame cut by the employment of an oxy-acetylene cutting blowpipe, most of the slag produced by the cutting reaction is blown downwardly through the kerf and falls away from the body. However, some of the liquid slag tends to collect on the surface of the body immediately adjacent the bottom edge of the kerf. When the body being cut is cold or at room temperature, the amount of slag that collects along the bottom of the kerf is relatively small and is of such a nature that it does not adhere firmly after it solidifies and it can ordinarily be brushed or scraped off. When, however, certain steel bodies are flame cut at a relatively high rate of speed, such slag accumulations may adhere quite firmly and the removal thereof constitutes a more difficult problem.

When ingots are hot rolled into billets and then into bars in a steel mill, the metal becomes elongated and is customarily cut up into convenient lengths while the bar is hot by various methods, such as shearing or hot sawing. Shearing distorts the end of the bar and cannot be employed when a square end is desired. Hot sawing produces a protuberance or fin of metal along the kerf which must be removed from at least one end of the bar when the bar is to be used for further processing, so that the protuberance will not be pressed into the bar and make a defective end. For example, in the manufacture of steel tubing, hot round bars are cut to a predetermined length and pierced while hot, a clean-cut end being very desirable for the piercing operation. It has also been proposed to cut such bars into desired lengths by effecting flame cuts at relatively high speed while the bars are hot. When severing hot bars, particularly round bars, with an oxy-acetylene blowpipe, a large portion of the slag collects on the underside of the cut edges and when solidified adheres very firmly. Such adherence is believed due to the fact that the slag so produced contains a relatively large percentage of unoxidized molten metal mixed with molten iron oxide and also because the surface metal of the bar is hot and therefore more easily melted. The highly heated molten slag welds itself to the surface on which it collects. Such slag adhesions are very undesirable and difficult to remove. To remove the slag adhesion by chipping or other manually operable methods is uneconomical, takes time, and requires that the bar be allowed to cool off.

It is a principal object of the present invention to provide a method of and apparatus for severing a metal body and rapidly removing a protuberance from a surface portion of the body adjacent a cut end thereof. A more specific object of the present invention is to provide an apparatus for rapidly shearing a slag adhesion from adjacent a flame-cut end of a hot ferrous metal bar. Other objects are to provide such an apparatus by which a knife shaped to fit the transverse contour of the body in the region of the protuberance may be caused to rapidly shear the protuberance from the body so as to leave the end of the cut bar relatively clean; by which the protuberance can be sheared from the bar while the bar is carried on a steel mill conveyor; by which the cutting operation may be automatically initiated by the movement of the bar along a conveyor to the cutting position; and by which a mechanism for removing the bar from the conveyor after the shearing operation is interconnected with the shearing mechanism for resetting it to operate on another bar.

These and other objects and novel features of the invention will become apparent from the following description and the accompanying drawing in which:

Fig. 1 is an elevational view partly in section of an exemplary mechanism, according to the invention, for shearing a slag adhesion from adjacent the end of a bar;

Fig. 2 is a view of a transverse section taken along the line 2—2 of Fig. 1;

Fig. 3 is another form of mechanism, according to the invention, for severing a metal body and shearing a protuberance from adjacent the cut end of the body; and Fig. 4 is a fragmentary view of the end portion of a flame-cut bar illustrating a slag adhesion.

Referring now to the drawing, and particularly Fig. 4, the bar indicated at B has been flame cut by an oxy-acetylene blowpipe directed vertically downwardly, and moved transversely across the bar, the slag produced when forming the end face E being indicated at S where it forms a firmly adhering mass or protuberance on the lower surface of the bar B immediately adjacent the end E. When a bar is severed such a slag adhesion generally forms at both sides of the kerf. Although it will generally be desirable to cut the slag protuberance from both sides of the kerf, in many instances it will be necessary to remove the protuberance from one end only of the bar when the bar is to be further processed since the slag protuberance generally causes trouble only at the end of the bar that enters the subsequent processing device, for example, a piercing mill.

A preferred form of apparatus is illustrated in Figs. 1 and 2. The mechanism is supported upon a base or frame F comprising a pair of parallel beams 10. The frame F also includes a box-like member 11 secured to the top flanges of the beams 10 adjacent the right-hand ends thereof. The member 11 is provided with front and back walls 12 and 13 having horizontally aligned openings therethrough. Extending through the opening in the front wall 12 is a bumper member 14 that normally projects a short distance outside of the front wall 12. The bumper 14 has an axial hole therethrough and is secured to horizontal rods 15 that extend rearwardly through the back wall 13. The portions of the rods 15 extending to the rear of the wall 13 are provided with jam nuts 16 which act as stops for preventing the movement of the bumper 14 too far to the left.

The bumper 14 is urged to and maintained in its leftward position by resilient means such as coil springs 17 which surround the rods 15 and act between the bumper 14 and the wall 13. An air cylinder 18 is mounted on the right-hand side of the wall 13 and has a movable piston rod 19 which extends horizontally through the rear plate 13 and through the opening in the bumper 14. The rod 19 is long enough so that when moved to the left as far as it will go, its extreme end will extend through the bumper 14 for a short distance. The bar B is supported upon conveyor rollers 20 so that it is horizontally movable toward the right and so that its end face E will contact with the bumper 14. The rollers 20 have axles journaled in bearings 21 which are supported on the frame beams 10. The rollers 20 are preferably motor driven, for example, by an electric motor 22 which is connected by suitable gearing with the rollers 20. Such gearing may comprise a longitudinal shaft 23 journaled in bearings 24 and having worms 25 that engage with worm wheels 26 on the shaft of each roller 20.

A knife 27 having a cutting edge 28 that is shaped to fit the transverse contour of the lower portion of the bar B is supported upon an arm 29 which is pivotally mounted on a transverse shaft 30 secured between the beams 10 at a point below the box-like member 11. The upper face of the knife 27 is chamfered toward the left of the knife edge 28 in order that the knife will slide downwardly under the bar B when the bar moves toward the right. The knife 27 is preferably secured to the arm 29 by quick detachable means such as the wedge 32 that passes through a slot in the tongue 31 extending downwardly from the knife 27 through the left-hand portion of the arm 29. The knife 27 is urged upwardly against the undersurface of the bar B by a spring 33 acting between a member 34 on the arm and a crossbar 35 between the lower flanges of the beams 10. Upward movement of the knife 27 is limited by an adjustable stop 36 on the arm 29 which engages with the bottom of the box-like member 11.

To hold the bar B down on the conveyor rollers 20 in opposition in action of the knife 27, a shoe 37 engages the top surface of the bar and is secured to the underside of the end portion of an arm 38 which extends transversely across the bar and then downwardly to a point immediately adjacent the bottom flange of the front beam 10 where it is pivotally connected to a hinge bracket 39. The arm 38 is movable into and out of operating position by means of a rockably supported power cylinder 40 having a connecting rod 41 connected to the arm 38.

Mechanism is also provided for lifting the bar B off the conveyor rollers after a slag severing operation. Such lifting or transferring mechanism may be of the type customarily employed in steel mills, that shown in the drawing being particularly suitable for transferring round bars. The transferring device is preferably located on the side of the conveyor opposite to the side on which the arm 38 is located and may comprise a horizontally supported shaft 42 on which is secured a plurality of transfer arms 43 which are located so as to enter the space between rollers 20 and engage with the undersurface of the bar B. The arms 43 have upper edges which are curved adjacent the ends of the arms to fit the contour of the bar. When the arms 43 are rotated counter-clockwise by the shaft 42, the bar B will be lifted up from the conveyor rollers and will roll along the top surface of the arms 43 and off the other end onto suitable receiving means such as another conveyor which is not shown in the interest of clearness of the drawing.

The operation of this slag removing mechanism may be made substantially automatic by the employment of suitable interconnecting control mechanism. Such mechanism may comprise a valve device having a cylindrical casing 44 with a slidable dumb-bell shaped piston therein. The side of the casing is provided with a central exhaust port 46 and two ports 47 and 48 spaced at suitable distances from the center. The casing is also provided with inlets 49 and 50 at each end. The side ports 47 and 48 connect with the rod end and the head end, respectively, of the cylinder 18 by conduits 51 and 52. The right-hand inlet 50 is connected by a conduit 53 with a valve 54 mounted on the base of the member 11 and air, under pressure, from a source of compressed air is supplied to the valve 54 through conduit 55. The valve 54 is opened by the movement of a bell-crank lever 56 which is engaged by a cam 57 secured to the end of the lower rod 15 so that the valve 54 is opened when the rod 15 is moved to the right by the engagement of the bar B with the bumper 14. The inlet 49 is connected by a conduit 58 with a valve 59 which is also connected with the source of compressed air by a conduit 60. The valve 59 is actuated by a cam 61 on the shaft 42.

The operation of the apparatus shown in Figs. 1 and 2, is as follows: The bar B having been flame cut at another place in the mill, and preferably on the conveyor, is moved to the right along the conveyor rollers 20 by means of the motor 22 until its face E engages with the bumper 14. The inertia of the bar moves the bumper 14 to the right, compressing the springs 17 and moving the rods 15 to the right which causes the cam 57 to engage with the bell-crank 56 and open the valve 54. Air under pressure then flows through conduits 55 and 53 into the right end of the casing 44, forcing the piston 45 to the left so as to permit communication between the ports 50 and 48 and between the port 47 and the exhaust 46. The air then flows through conduit 52 into the head end of cylinder 18 and is exhausted from the rod end of the cylinder through the conduit 51. The piston rod 19 is thus forced to the left against the face E of the bar. The combined action of the recoil force of the springs 17 and the force of the rod 19 pushes the bar toward the left, sliding it along the conveyor even though the rolls 20 may still be turning clockwise. At the same time that the cylinder 18 is energized, the cylinder 40 is also energized, for example, by a branch conduit 52' leading from conduit 52 to the head end of cylinder 40, to move the arm 38 toward the bar and hold the shoe 37 against the top of the bar. While the bar moves toward the right, the slag adherence S at the bottom rides over the knife 27 causing the knife to move downwardly a short distance against the action of spring 33. After the slag S has passed to the right of the knife edge 28, the knife 27 will be held up in contact with the surface of the bar in position for cutting. The face E' of the bar during the recoil moves to the left and leaves contact with the bumper 14 at a position at which the knife edge 28 is just beginning to cut into the slag S. The rod 19, however, continues to push the bar to the left a sufficient distance so that the slag S is completely severed from the bar by the knife edge 28.

As soon as this occurs, the shaft 42 is rotated counter-clockwise to bring the arm 43 up against the bottom of the bar, which movement causes the cam 61 to open the valve 59 to admit air through conduits 60 and 58 to the left end of the casing 44 and force the piston 45 to the right, the valve 54 being now closed due to the retraction of the rods 15. The air is exhausted from the head end of the cylinder 18 through conduit 52, ports 48 and 46, and air under pressure is admitted from inlet 49 to port 47 and through conduit 51 to the rod end of the cylinder 18 to retract the rod 19. At the same time air pressure is admitted to the rod end of cylinder 40 by branch conduit 51' for retracting the arm 38. The shoe 37 is thereby drawn out of the way so that continued rotation of the arm 42 may lift the bar B from the conveyor and transfer it to another conveyor. The apparatus is now prepared for operating on another bar.

In the form of apparatus shown in Fig. 3 the knife 127 is carried at the end of an arm 129 that has its lower end pivoted at 130 to a frame portion 110 at a point substantially directly under the end face E of the bar B. The arm 129 is swung through an arc about its pivoted lower end by a power cylinder 118 which is pivotally secured to a frame portion 113 and has its piston rod 119 pivotally secured to the arm 129.

As shown in Fig. 3 the knife edge 128 is preferably arranged so that when the arm 129 is vertical, the edge is in a transverse plane which is at a substantial angle to a plane perpendicular to the axis of the bar B. By setting the knife at a transverse angle or arranging the edge 128 to have a spiral shape, the slag adhesion S will be more gradually sheared off since the knife will be cutting the slag at a single narrow portion of the knife at any particular portion of the cutting operation. Such progressive cutting will require less power and the slag will be sheared more cleanly.

The operation of the form of apparatus shown in Fig. 3 is schematically illustrated by indicating successive positions of the knife in broken lines.

The bar B is supported upon conveyor rollers 120 and is stopped at a position so that the place where the bar is to be severed is directly under the cutting blowpipe indicated at T. The cutting blowpipe T is supplied with heating and oxidizing gases to ignite and burn the metal to be removed and then moved transversely across the bar to form a kerf for severing the bar, the slag produced forming adhesions S on both sides of the kerf. When the bar B is severed in two, the right-hand portion B' of the bar is moved to the right along the conveyor; the arm 129 is then swung rapidly through an arc by the cylinder 118 and the knife edge 128 severs the slag S from the bar by a quick blow. The distance between the knife edge 128 and the pivot axis 130 is preferably slightly greater than the normal distance between the underside of the bar B and the pivot axis 130. Therefore, when the knife edge 128 strikes the slag, the end of the bar B will jump upward slightly. However, the inertia of the bar B is such that the slag adhesion will be effectively severed by the quick blow of the knife 127.

The invention is not limited to the exact details disclosed and it will be seen that certain features of the invention may be used independently of others and changes may be made in various features of the apparatus without departing from the essentials of the invention. For example; other motive fluids than compressed air, such as steam, water or oil may be employed in the control apparatus or electrical control devices could be substituted. It is not essential that the conveyor rollers 20 be motor driven for the bar B may be moved by other means such as by gravity. Also, the power cylinder 18 may be omitted, and the bar B moved to the left sufficiently to effect the slag removal solely by the recoil action of the springs 17. Other resilient means may be employed in place of the springs 17 such as a compressed air cushion. Under some conditions it may also be desirable to give the knife edge 28 a spiral form in the apparatus of Fig. 1 similarly to the knife edge 128 of the embodiment shown in Fig. 3 and for similar reasons. The cutting edge portion of the knife or the whole knife is preferably formed of a metal that retains adequate strength and hardness when subject to the heat of a hot bar such, for example, as the alloy commercially known as "Stellite." The apparatus according to this invention is adapted to remove any relatively small protuberance near the end of a round or rectangular bar by providing an edge on the knife which is shaped to fit the contour of the surface and where "slag adhesion" is referred to in the claims, it is to be understood that any adhering protuberance is included.

We claim:

1. In apparatus for removing a slag adhesion from a surface portion of a metal body, means for horizontally supporting said body with said slag adhesion downwardly disposed; a cutting knife disposed under said body and having a cutting edge adapted to contact said surface portion transversely of said body; and means for effecting relative movement between said knife and said body in a direction forcing said cutting edge against said slag and longitudinally of said body whereby said slag is severed cleanly from said body.

2. Apparatus for removing a slag adhesion from a surface portion of a metal body according to claim 1 in which said knife is provided with an edge formed spirally with respect to the surface of said body.

3. Apparatus for removing a slag adhesion from a surface portion of a metal body according to claim 1 which includes an arm for supporting said knife; a base, said arm being pivotally connected to said base for providing movement of said knife about an axis extending transversely of said body and means acting to move said knife toward said surface portion of the body.

4. In apparatus for removing a slag adhesion from a surface portion of a metal body adjacent a flame-cut end thereof, means for horizontally supporting said body with said slag adhesion downwardly disposed; a cutting knife having an edge contour corresponding to said surface portion; a base; an arm secured to said knife and pivoted to said base, said pivot having an axis extending transversely of said body and located substantially directly below said slag adhesion at a distance from said surface portion which is slightly less than the distance between said knife edge and said pivot axis; and means for relatively rapidly swinging said arm and said knife through an arc about said pivot for severing said slag adhesion from said surface portion.

5. In an apparatus for removing a slag adhesion from a surface portion of a metal body adjacent a flame-cut end thereof, means for supporting said body; a cutting knife having an edge contour corresponding to said surface portion; a frame; an arm secured to said knife and pivoted to said frame, said pivot having an axis extending transversely of said body and located in a transverse plane through said slag adhesion at a distance from said surface portion which is slightly less than the distance between said knife edge and said pivot axis; and means for relatively rapidly swinging said arm and said knife through an arc about said pivot for severing said slag adhesion from said surface portion.

6. In apparatus for removing a slag adhesion from a surface portion of a metal body adjacent a flame-cut end thereof, conveyor means for horizontally supporting and longitudinally moving said body; a cutting knife having an edge contour corresponding to the transverse contour of said surface portion, said knife edge being adapted for cutting only during one direction of movement of said body; a frame; means for supporting said knife for movement toward and away from said surface portion and for urging said knife toward said surface portion; and means for stopping and reversing the longitudinal movement of said body when it is moved by said conveyor toward said knife in the non-cutting direction and to a position such that the slag adhesion has passed said knife edge, the reverse movement being sufficient to effect complete severance of said slag adhesion by the passage of said surface portion against said knife edge to the cut end of the body.

7. Apparatus for removing a slag adhesion from a surface portion of a metal body according to claim 6 in which said means for stopping and reversing the longitudinal movement of the body comprises a member adapted to engage the end of said body and supported on said frame for horizontal movement with respect thereto; and means connected to said frame and said member for storing the energy of impact of said body against said member and for effecting the recoil of said body therefrom.

8. Apparatus for removing a slag adhesion from a surface portion of a metal body according to claim 6 in which said means for stopping and reversing the longitudinal movement of the body comprises a member adapted to engage the end of said body; a fluid-pressure cylinder secured to said frame and having a horizontally movable piston therein, said member being operatively connected with said piston; and means for admitting fluid under pressure to said cylinder for forcing said member in the direction toward the end of said body.

9. Apparatus for removing a slag adhesion from a surface portion of a metal body according to claim 6 in which said means for stopping and reversing the longitudinal movement of the body comprises a member adapted to engage the end of said body and having a horizontal passage therethrough; a fluid-pressure cylinder secured to said frame; a horizontally movable piston in said cylinder having a rod extending through said passage for engagement with the end of said body, said member being slidable along said rod; resilient means between said member and said frame for cushioning the impact of said body against said member and for acting to effect the recoil of said body therefrom, and means for automatically admitting fluid to said cylinder during the reverse movement of said body to insure the reverse movement of said body for a distance sufficient to completely sever said slag adhesion.

10. Apparatus for removing a slag adhesion from a surface portion of a metal body according to claim 6 in which said knife-supporting means comprises an arm pivotally connected to said frame; resilient means acting between said arm and said frame for urging said knife toward said body; and means for limiting the movement of said knife in the direction toward said body.

11. Apparatus for removing a slag adhesion from a surface portion of a metal body according to claim 6 which includes means acting on the side of said body opposite said knife for holding said body against the knife.

12. Apparatus for removing a slag adhesion from a surface portion of a metal body according to claim 6 in which said means for stopping and reversing the longitudinal movement of the body comprises a member adapted to engage the end of said body and having a horizontal passage therethrough; a fluid-pressure cylinder secured to said frame; a horizontally movable piston in said cylinder having a rod extending through said passage for engagement with the end of said body, said member being slidable along said rod; resilient means between said member and said frame for cushioning the impact of said body against said member and for acting to effect the recoil of said body therefrom; and means connected to said member and engaging said frame for stopping the movement of said member toward said knife at a point spaced a substantial distance from said knife, the end of said piston rod being movable to a point beyond the edge of said knife.

13. In apparatus for removing a slag adhesion from a surface portion of a metal body adjacent a flame-cut end thereof, conveyor means for horizontally supporting and longitudinally moving said body; a cutting knife having an edge contour corresponding to the transverse contour of said surface portion, said knife edge being adapted for cutting only during one direction of movement of said body; a frame; means for supporting said knife for movement toward and away from said surface portion and for urging said knife toward said surface portion; fluid-pressure operated means supported by said frame for acting against the end of said body to reverse the movement thereof when energized; and valve means operable by movement of said body toward said fluid-pressure operated means for admitting fluid to and energizing said pressure-operated means.

14. In apparatus for removing a slag adhesion from a surface portion of a metal body adjacent a flame-cut end thereof, conveyor means for horizontally supporting and longitudinally moving said body; a cutting knife having an edge contour corresponding to the transverse contour of said surface portion, said knife edge being adapted for cutting only during one direction of movement of said body; a frame; means for supporting said knife for movement toward and away from said surface portion and for urging said knife toward said surface portion; fluid-pressure operated means supported by said frame for acting against the end of said body to reverse the movement thereof when energized; and valve means operable by movement of said body toward said fluid-pressure operated means for admitting fluid to and energizing said pressure-operated means; means for lifting said body off said conveyor; and another valve means operable by said lifting means for energizing said fluid operated means to move back to the retracted position in preparation for another cycle of operation.

15. A method which comprises horizontally positioning a ferrous metal bar with respect to blowpipe means; flame cutting said bar by the application of a cutting flame from said blowpipe means downwardly directed and moved transversely of said bar, said flame cutting being at a relatively rapid rate such that a firmly adhering mass of slag forms on the under surface of said bar adjacent the kerf produced; moving one severed portion of said bar away from a remaining portion thereof; and rapidly mechanically shearing said mass from the under surface of said remaining portion of said bar while said mass is still hot by a single movement of said mass away from said remaining portion.

16. A method which comprises horizontally positioning a ferrous metal bar with respect to blowpipe means; flame cutting said bar by the application of a cutting flame from said blowpipe means downwardly directed and moved transversely of said bar, said flame cutting being at a relatively rapid rate such that a firmly adhering mass of slag forms on the under surface of said bar adjacent the kerf produced; and while said mass is still hot, moving one severed portion of the bar lengthwise with respect to a shearing device in a direction such that said mass is bodily sheared from said bar by a single movement of said mass toward the flame-cut end thereof.

17. Apparatus for severing a ferrous metal bar which comprises conveyor means for horizontally supporting and positioning such bar to be cut; blowpipe means for flame cutting said bar, said blowpipe means being arranged for applying a downwardly directed cutting flame to said bar and for moving said flame transversely of said bar at a relatively rapid rate whereby a firmly adhering mass of slag is formed on the under surface of said bar adjacent the kerf produced; means for moving the severed portions of said bar lengthwise; and means for rapidly shearing such slag mass from at least one of said severed portions while said mass is still hot, such shearing means being constructed and arranged to effect relative movement between said severed portion and a cutting knife in a direction such that said mass will be sheared from said bar toward the flame-cut end.

18. Process of removing a slag adhesion from the lower edge of a ferrous metal bar, which comprises the step of completely mechanically shearing said adhesion, in the form of a slag mass, from said edge in a single pass in a direction substantially parallel to the longitudinal axis of said bar while the latter and said slag mass are at an elevated temperature at least of the order of the hot rolling temperature of said bar.

19. A method of removing a firmly adhering mass of slag from a body of ferrous metal adjacent the outer edge of a freshly flame-cut surface thereof while said body is at a hot rolling or piercing temperature, which comprises mechanically shearing said mass from said edge of the freshly cut surface in a single pass in a direction substantially parallel to the outer surface of said body, while both said body and said mass are still hot.

FRANK C. GEIBIG.
HOMER W. JONES.

CERTIFICATE OF CORRECTION.

Patent No. 2,267,792.                                                  December 30, 1941.

FRANK C. GEIBIG, ET AL.

It is hereby certified that error appears in the printed specification of the above numbered patent requiring correction as follows: Page 2, second column, lines 22 and 23, strike out "enter the space between rollers 20 and"; line 66, for "inertia" read --momentum--; page 3, first column, line 46, for "arm 42" read --arm 43--; and second column, line 50, for "alloy" read --metal--; line 51, for "Stellite" read --"Stellite" alloy--; and that the said Letters Patent should be read with this correction therein that the same may conform to the record of the case in the Patent Office.

Signed and sealed this 17th day of February, A. D. 1942.

Henry Van Arsdale, (Seal)                                            Acting Commissioner of Patents.